H. L. JESSEN.
GAS ENGINE VALVE.
APPLICATION FILED MAR. 26, 1908.
935,989.
Patented Oct. 5, 1909.
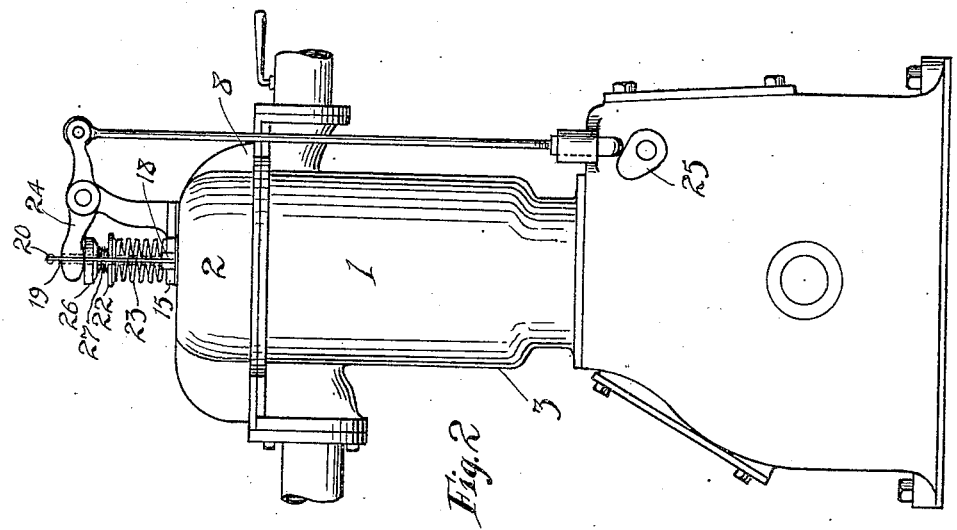
WITNESSES:
INVENTOR,
Henry L. Jessen,
BY
F. W. Wright
ATTORNEY.

UNITED STATES PATENT OFFICE.

HENRY L. JESSEN, OF ALAMEDA, CALIFORNIA.

GAS-ENGINE VALVE.

935,989.  Specification of Letters Patent.  Patented Oct. 5, 1909.

Application filed March 26, 1908. Serial No. 423,333.

*To all whom it may concern:*

Be it known that I, HENRY L. JESSEN, a citizen of the United States, residing at Alameda, in the county of Alameda and State of California, have invented new and useful Improvements in Gas-Engine Valves, of which the following is a specification.

The object of the present invention is to provide an improved form of exhaust valve for gas or gasolene engines, which will be more convenient in assembling, and will positively prevent any leakage through said valve, in the suction movement of the piston.

It is essential, in a gas engine, to maintain the proper proportion between the air and gas or vapor. If any part of the burned gases that has been discharged through the exhaust valve is drawn back into the cylinder again, when a smaller volume is allowed to enter through the throttle, then such proportion is changed, and the best results cannot be obtained.

In a large gas engine of the type in which the speed is controlled by a throttle, or with a throttling governor, considerable trouble is experienced from the fact that when the throttle is partly closed to draw in a small charge, the suction of the piston, in drawing in the charge, is so powerful that it is difficult to prevent the exhaust valve opening due to this suction. To prevent this it has been heretofore necessary to use a spring of great power in proportion to the work otherwise required to be done by said spring. But this is objectionable, on account of the fact that the great pressure exerted by this spring, operating several hundred times a minute, creates a great wear on the parts connected to the valve, so that these parts require to be frequently renewed.

The object of the present invention is to obviate the above difficulty and expense.

In the accompanying drawing, Figure 1 is a section through the exhaust valve of a gas engine equipped with my improvement; Fig. 2 is a side view on a smaller scale of a portion of a gas engine.

Referring to the drawing, 1 indicates the cylinder of the engine provided with the usual cylinder head 2, and having the water cooling chamber 3. Said head is formed with a housing 4 to receive a valve cage 5, having a seat 6 on the cylinder head. The housing and the valve cage are formed with apertures 7, leading to an exhaust conduit 8 formed in the cylinder head. Said cage is formed with an elongated bearing 9 in which slides a valve stem 10, carrying at its inner end the exhaust valve 11 adapted to rest against a valve seat 12 upon the end of the cage. At its outer end the bearing is threaded, as shown at 13, and a nut 14 is screwed thereon, and bears upon a collar 15 surrounding the bearing, which collar is thereby pressed against a boss 16 formed upon the cylinder head. By means of this nut, the cage is firmly drawn against the seat 6 formed in the cylinder head. This construction is of great convenience in assembling the parts. It has heretofore been the practice to form this cage so as to have two tight bearings or joints, one on the inside, and the other on the outside of the cylinder head. It has been difficult to make these two joints tight at the same time. The above construction avoids this difficulty. Moreover, it enables the water jacket 3 to be so formed as to extend into close proximity with the tubular bearing 9, which so far as my knowledge extends, has not heretofore been possible, and thus to maintain said bearing cool.

Upon the collar 15 are formed two forked lugs 18, in each of which is pivoted a locking lever 19, the outer ends of said levers connected by a coiled spring 20. Said levers are formed with shoulders 21 which abut against the inner surface of a collar 22 screwed upon the threaded valve stem. A coiled spring 23 is interposed between said collar 22 and the collar 15, which spring normally presses said collar 22 outward and thus holds the valve against its seat. This construction, of the collar 21 and the spring 23 for pressing against said collar to hold the valve to its seat, is, in general, the construction in common use. And, in connection with this, it has been the practice to provide a lever 24, actuated by a cam 25 upon the engine, which lever, at the proper time, is operated by said cam 24 to depress the valve stem 10 and open the exhaust valve. This lever 24 I still employ, but it now bears against a conical wedge 26, which slidably engages the valve stem 10, and is normally pressed away from the collar 22 by means of a light spring 27. This conical wedge is adapted to engage inclined surfaces 28, formed on the levers 19.

With this construction the following is the operation of the device. When the lever 24 is actuated by the cam 25 to depress the valve stem, said lever no longer acts directly upon the stem, since the conical wedge is not directly connected to said stem, and the first effect of said operation of the lever is to force said wedge against said sloping surfaces 28 of the locking levers, and thereby move said locking levers apart. By this movement, the shoulders 21 on said levers are withdrawn from the inner surface of the collar 22 so that said collar is now free to move downward. The inner or under side of the conical wedge 26 then bears against the outer end of the hub of the collar 20, and positively presses said collar inward against the action of the coiled spring 23, thereby positively forcing inward the valve stem and opening the valve. As soon as the cam has rotated to such a point as to permit the lever 24 to be withdrawn, to allow the valve 11 to return to its seat, the spring 23 returns the collar 22 to such a position that the shoulders 21 on the locking levers 19 can again engage the same, which they do, owing to said levers 19 being drawn together by the coiled spring 20. The light spring 27 also returns the conical wedge to its original position.

I prefer to make the shoulders 21 of the levers 19 slightly beveled, for the reason that the spring 20 then operates, by pulling together the levers 19, to force the collar 22 outward, thereby drawing said exhaust valve tight to its seat. Moreover by the beveled form of the wearing surfaces, any wear upon the collar 22 or levers 19 is taken up.

I claim:—

1. In a gas engine, an exhaust valve, a lever for opening said valve at a suitable stage in the cycle of the engine, a spring for resisting said opening, means for positively locking said valve except at said stage, and means for withdrawing said locking means, actuated by said lever, substantially as described.

2. In a gas engine, an exhaust valve having a stem, means for opening said valve at a suitable stage in the cycle of the engine, a locking lever for preventing said opening, said locking lever having an oblique edge, and a device movable on the stem of the exhaust valve, and arranged to be actuated by said opening means by its engagement with said oblique edge to withdraw said locking lever, substantially as described.

3. In a gas engine, an exhaust valve having a stem, a disk, on said stem, locking levers having shoulders adapted to engage said disk to lock said exhaust valve to its seat, said locking levers having oblique edges, a spring connecting said locking levers, a lever for opening said exhaust valve, and a cone movable on said valve stem and adapted to be actuated by said latter lever to engage said oblique shoulders to withdraw said locking levers, substantially as described.

In testimony whereof I have hereunto set my hand in the presence of two subscribing witnesses.

HENRY L. JESSEN.

Witnesses:
F. M. WRIGHT,
D. B. RICHARDS.